No. 742,655. PATENTED OCT. 27, 1903.
J. HOMOLA.
HOSE COUPLING.
APPLICATION FILED JUNE 20, 1903.
NO MODEL.

Witnesses:
R. H. Butler
E. E. Potter

Inventor
John Homola,
By H. C. Evert & Co.
Attorneys.

No. 742,655. Patented October 27, 1903.

UNITED STATES PATENT OFFICE.

JOHN HOMOLA, OF ALLEGHENY, PENNSYLVANIA.

HOSE-COUPLING.

SPECIFICATION forming part of Letters Patent No. 742,655, dated October 27, 1903.

Application filed June 20, 1903. Serial No. 162,324. (No model.)

*To all whom it may concern:*

Be it known that I, JOHN HOMOLA, a citizen of the United States of America, residing at Allegheny, in the county of Allegheny and State of Pennsylvania, have invented certain new and useful Improvements in Hose-Couplings, of which the following is a specification, reference being had therein to the accompanying drawings.

This invention relates to certain new and useful improvements in hose-couplers, and has for its object the provision of novel means whereby two sections of hose may be quickly, easily, and effectually coupled together.

Another object of my invention is to provide a hose-coupler which will be extremely simple in construction, strong and durable, comparatively inexpensive to manufacture, and highly efficient when used.

Briefly described, my improved hose-coupler comprises two members, the one member of which is adapted to be secured within the other member, means being provided on said member whereby the two sections may be readily locked together, and means being provided upon said sections whereby it will be impossible for one member to rotate independently of the other or become disengaged when they have been once locked together.

In describing the invention in detail, reference is had to the accompanying drawings, forming a part of this specification, and wherein like numerals of reference indicate like parts throughout the several views, in which—

Figure 1:
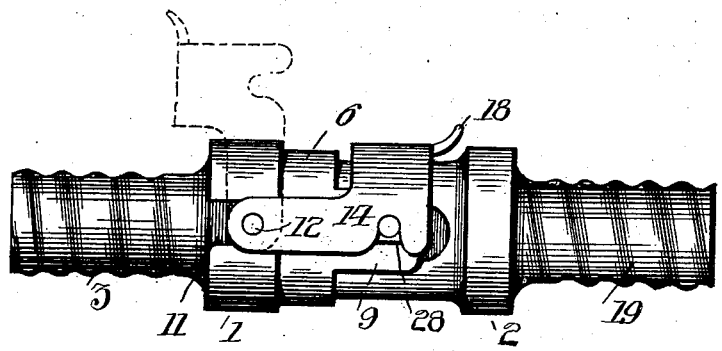
Figure 2:
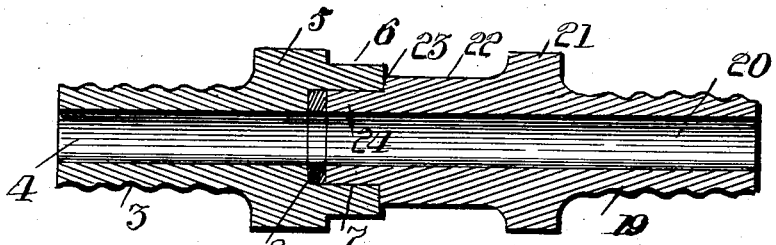
Figure 3:
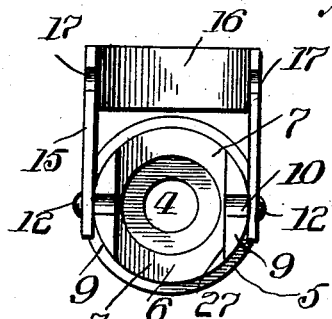
Figure 4:
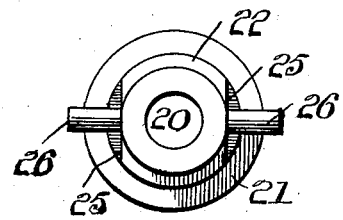

Figure 1 is a side elevation of my improved hose-coupler. Fig. 2 is a longitudinal sectional view thereof. Fig. 3 is an end view of one of the sections, and Fig. 4 is an end view of the other section.

To put my invention into practice, I provide a hose-coupler comprising two sections, a female member 1 and a male member 2, the female member of which comprises a tubular portion 3, having an aperture 4 formed longitudinally of its length, and upon said portion are formed the enlarged collars 5 and 6, and in the end of this section 1 is formed the annular recess 7, in which is mounted the gasket 8. The enlarged collar 6 carries the outwardly-extending flanges 9, having slots 10 formed in their ends and centrally of the extensions 9, and upon the enlarged collar 5 I provide the flattened surfaces 11, upon which is mounted by a pin 12 the yoke 14. This yoke comprises the arms 15, which as heretofore stated are pivoted to the enlarged collar 5, and formed integral with the outer end of the arm is a semicircular portion 15, which is adapted to span the male member 2 when the two sections are secured together. This yoke 14 has its lower edge, preferably near its end, cut away, as indicated at 17, forming a slot, the object of which will be hereinafter described. This yoke 14 has formed integral with the portion 16 the operating-lever 18, whereby the yoke may be readily raised or lowered, as it is desired.

The male member 2 comprises a tubular portion 19, having an aperture 20 formed centrally of its length, and when the two members are secured together this aperture is adapted to register with aperture 4 of the female member 1. The tubular extension 19 carries the enlarged collars 21 and 22, the enlarged collar 22 being cut away upon its end, as indicated at 23, forming an annular portion 24, which is adapted to be seated within the annular recess 7 of the female member 1. The enlarged collar 22 carries the flattened surfaces 25, and in these surfaces or sides of the enlarged collar 2 are secured by any desired means the pins 26, which when the two members are secured together are adapted to be engaged in the slots of the extending flanges 9 of the 10, formed in the female portion 1. When the pins 26 have been so engaged, the yoke 14 is adapted to be lowered, whereby the slots 17 will engage the pins 26 and hold the sections in a locked position.

It will be noted that by the construction of the flattened surfaces upon the enlarged collar 22 and the flattened surfaces 27 of the extending flanges 9 it will be impossible for either one of the members comprising the hose-coupling to be rotated independently of the other, and it will also be seen that by the inclined surface 28, formed on one side of the slot 17, the two sections may be readily forced together and a complete and water-tight coupling provided.

It will be obvious that various changes may be made in the details of construction without departing from the general spirit of my invention.

Having fully described my invention, what I claim as new, and desire to secure by Letters Patent, is—

In a hose-coupling the combination with a female member, enlarged collars formed thereon, one of said collars being larger than the other and having flat surfaces thereon, the other of said collars being reduced, integral outwardly-extending flanges formed on said reduced collar at opposite sides thereof and being provided with longitudinal slots therein, a male member provided with collars corresponding with those of the female member, the reduced collar of said male member having a cut-away portion adapted to seat in the reduced collar of the female section, outwardly-extending pins mounted in said male member upon the reduced collar thereof, said pins adapted to engage in the slots of the flanges carried by the female member, and a locking means pivotally mounted upon the flattened surface of the larger collar of the female member, said locking means comprising outwardly-extending arms supporting a semicircular portion thereon, said portion being adapted to engage with the pins of the male section, substantially as described.

In testimony whereof I affix my signature in the presence of two witnesses.

JOHN HOMOLA.

Witnesses:
H. C. EVERT,
E. E. POTTER.